United States Patent [19]
Okamoto

[11] Patent Number: 5,806,311
[45] Date of Patent: Sep. 15, 1998

[54] EXHAUST ARRANGEMENT FOR OUTBOARD MOTOR

[75] Inventor: Yataka Okamoto, Hamamatsu, Japan

[73] Assignee: Sanshin Kogyo Kabushiki Kaisha, Hamamatsu, Japan

[21] Appl. No.: 693,431

[22] Filed: Aug. 7, 1996

[30] Foreign Application Priority Data

Aug. 7, 1995 [JP] Japan .................................. 7-200949

[51] Int. Cl.⁶ ............................ F02B 61/04; F02B 61/06
[52] U.S. Cl. .............................................................. 60/323
[58] Field of Search ............................ 60/323, 321, 322, 60/313

[56] References Cited

U.S. PATENT DOCUMENTS

| | | | |
|---|---|---|---|
| 4,022,019 | 5/1977 | Garcea | 60/323 |
| 4,484,440 | 11/1984 | Oki et al. | 60/323 |
| 5,010,731 | 4/1991 | Onishi | 60/323 |
| 5,109,668 | 5/1992 | Lindstedt | 60/323 |
| 5,251,439 | 10/1993 | Nakase et al. | 60/321 |
| 5,471,835 | 12/1995 | Friedman | 60/323 |

*Primary Examiner*—Marguerite McMahon
*Attorney, Agent, or Firm*—Knobbe, Martens, Olson & Bear LLP

[57] ABSTRACT

A number of embodiments of four-cylinder, four-cycle outboard motors having a compact exhaust system and yet one in which the exhaust pulses from one cylinder are not transmitted to other cylinders so as to interfere with their operation. This is accomplished by providing a series of paired exhaust manifolds with no two successive firing cylinders being served by the same manifold.

23 Claims, 8 Drawing Sheets

EXHAUST ARRANGEMENT FOR OUTBOARD MOTOR

BACKGROUND OF THE INVENTION

This invention relates to an exhaust system for an outboard motor and more particularly to an improved multi-cylinder outboard motor exhaust system.

As is well known, the design of engines and their auxiliary components for outboard motors presents a number of design obstacles. An area where the design is particularly significant and difficult is in the configuration of the exhaust system. In outboard motor applications, unlike many other types of vehicle applications wherein internal combustion engines are utilized as prime movers, the space is of an extreme premium. Although with motor vehicles the engine compartment may be somewhat restricted, such auxiliaries as the exhaust system can be relatively freely designed. That is, it is possible to provide a long exhaust system and space is available outside of the engine compartment for various types of exhaust silencing and tuning devices.

In outboard motor applications, on the other hand, the exhaust system must all be confined within the entire housing of the outboard motor. Thus, space constraints are at a maximum and there is the additional concern of heat transfer between the exhaust system and the other components of the outboard motor.

In a conventional practice as utilized in outboard motors, the exhaust system for the engine is formed in substantial part in the cylinder block. That is, the exhaust manifold is formed generally integrally within the cylinder block and the exhaust gases are delivered from this exhaust manifold downwardly to an exhaust system in the drive shaft housing and lower unit. The drive shaft housing and lower unit contain an arrangement wherein the exhaust gases are cooled by the cooling water from the engine and are silenced by passing them through one or more expansion chambers and other silencing devices. In addition, the exhaust gases are discharged to the atmosphere through the body of water in which the watercraft is operating. As a result, the action of this body of water further assists in the silencing.

This type of exhaust system is generally utilized both with four-cycle and with the more conventional two-cycle engine practice. With two-cycle engines, this arrangement is easily facilitated since the exhaust ports are formed in the cylinder block. Thus, the formation of the exhaust manifold also in this cylinder block presents no significant problems. However, with four-cycle engines and particularly overhead valve engines, the exhaust system becomes more complicated. This may be best understood by reference to FIGS. 1 and 2 which are, respectively, top and side views of the power head of a conventional four-cycle outboard motor. Portions are broken away in each figure so as to show the details of the exhaust system.

Figure 1:
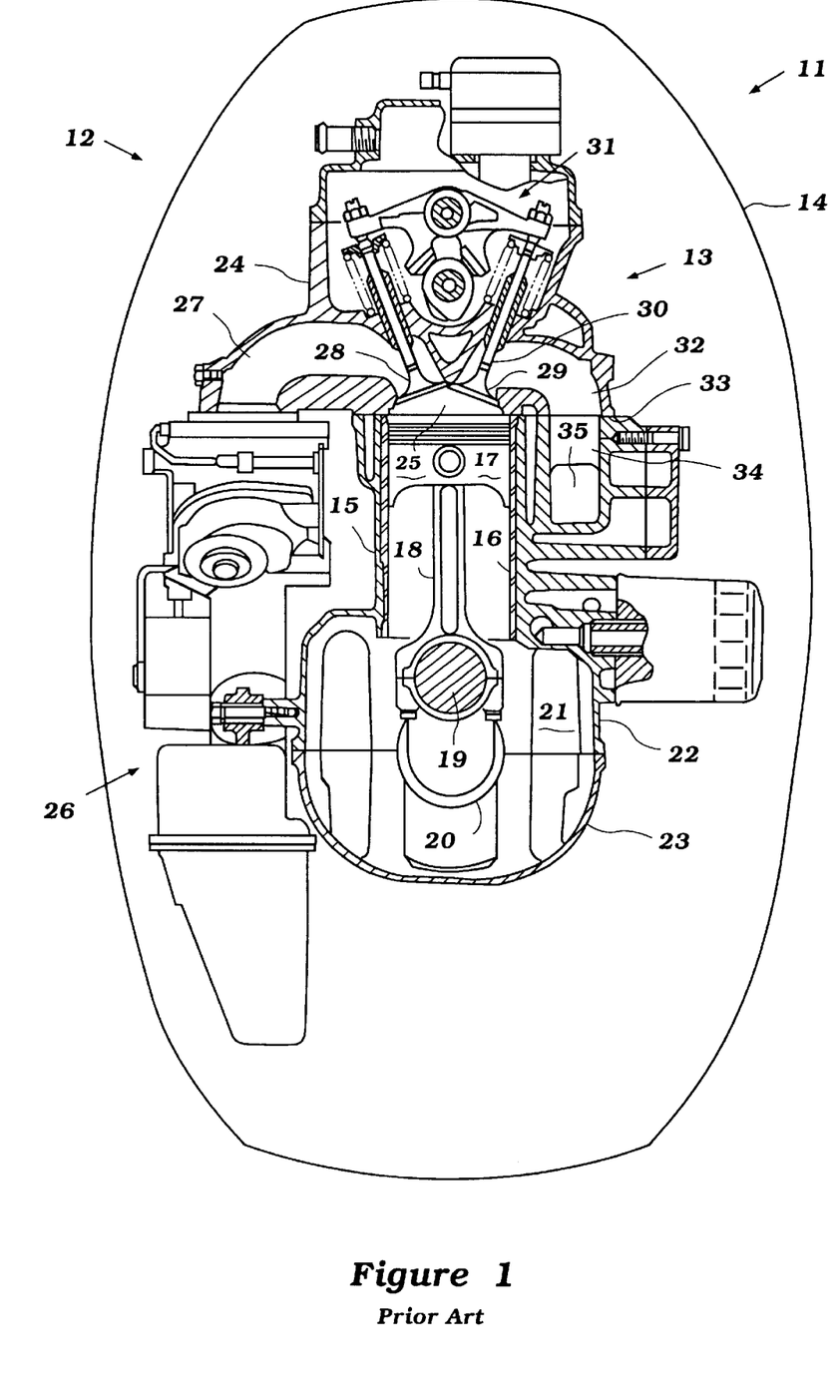
FIG. 1 is a top plan view of a prior art type outboard motor with portions broken away and shown in section and with the protective cowling shown only in outline to show various internal components of the internal combustion engine.
Figure 2:
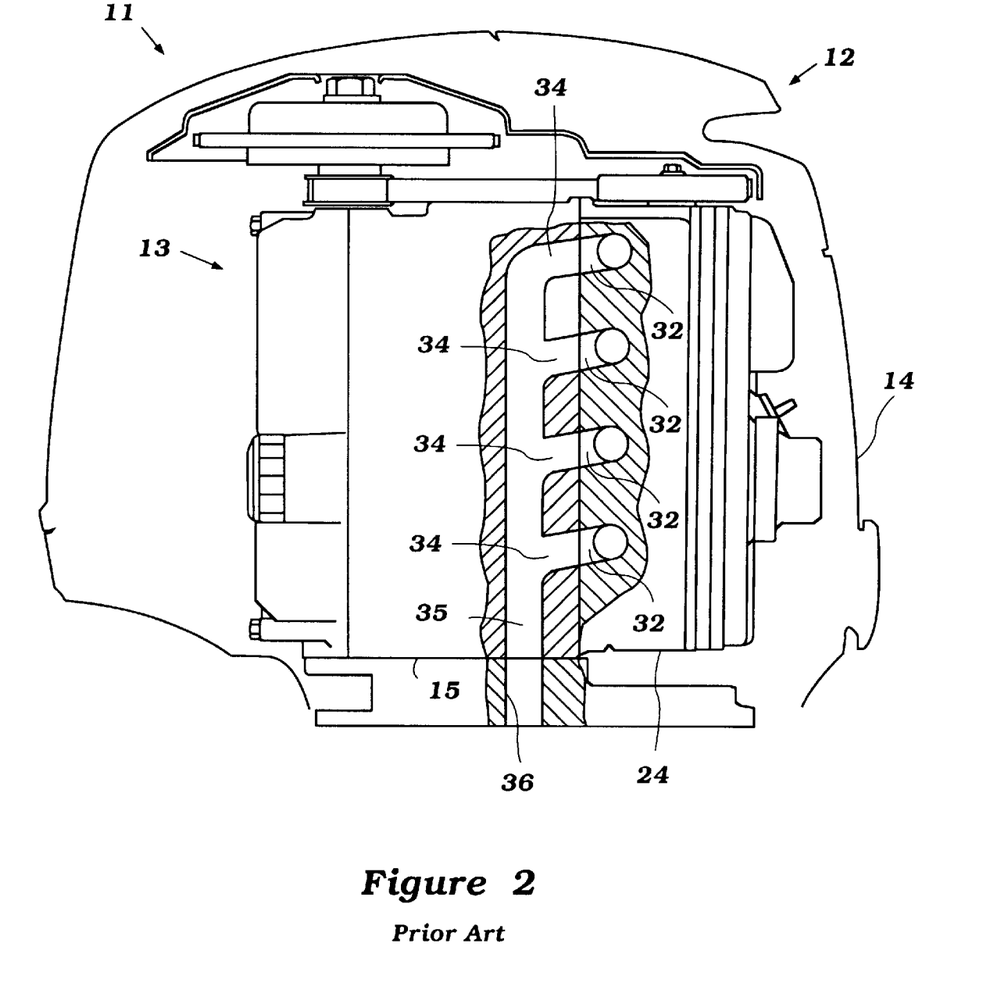
FIG. 2 is a partial side elevational view of the prior art type outboard motor of FIG. 1 with portions of the engine broken away and shown in section and with toe outer housings shown only in outline to illustrate the exhaust manifold for the engine.

These two figures of the drawings show a portion of an outboard motor of a conventional type, which outboard motor is indicated generally by the reference numeral 11 and more specifically the power head, indicated generally by the reference numeral 12 therefore. The power head 12 is comprised of a powering internal combustion engine 13 and a surrounding protective cowling 14.

Portions of the engine 13 have been illustrated in cross-section in order to illustrate the problems in connection with the prior art types of construction as shown in these two figures. The engine 13 will be described only generally in order to make the reader more familiar with the problem attendant with the prior art. Where any portions of the engine 13 are not described, they may be considered to be conventional.

The engine 13 includes a cylinder block 15 which, in the illustrated construction is of the four-cylinder in-line type. To this end, the cylinder block 15 is formed with four horizontally-disposed cylinder bores 16, only one of which appears in the figures. The cylinder bores 16 are formed one vertically above the other.

Pistons 17 reciprocate in the cylinder bores 16 and are connected by means of connecting rod 18 to the throws 19 of a crankshaft 20. The crankshaft 20 is journaled, as is typical with outboard motor practice, for rotation about a vertically extending axis within a crankcase chamber 21. This crankcase chamber 21 is formed by a skirt 22 of the cylinder block 15 and a crankcase member 23 that is detachably connected thereto.

A cylinder head assembly 24 is affixed to the end of the cylinder block 15 opposite to the crankcase chamber 21. The cylinder head 24 has recesses 25 which are positioned in closing relationship to the cylinder bores 16. These recesses 25, the heads of the pistons 17, and the cylinder bore 16 form the combustion chambers of the engine.

An induction system, indicated generally by the reference numeral 26 provides an air/fuel charge to intake passages 27 that are formed in one side of the cylinder head 24 and which terminate at valve seats that are controlled by poppet-type intake valves 28.

As should be apparent from the foregoing description, the invention here deals in the area of the exhaust system and in the prior art type of construction, the exhaust system includes exhaust ports or valve seats 29 that are formed in the cylinder head 24 on the side thereof opposite the intake passages 27. These exhaust valve seats 29 are controlled by poppet-type exhaust valves 30. The intake and exhaust valves 28 and 30 are operated by means of a single overhead cam shaft, rocker arm type valve actuating mechanism, indicated generally by the reference numeral 31.

The exhaust valve seats 29 communicate with individual exhaust passages 32 which extend through the exhaust side of the cylinder head 24 from the valve seats 29. These exhaust passages 32 terminate in a lower face 33 of the cylinder head wherein they merge into inlet sections 34 of an exhaust manifold that is formed integrally in the facing surface of the cylinder block 15. These inlet sections 34 all communicate with a common vertically extending collector section 35 of the exhaust manifold. This collector section extends downwardly through an exhaust guide 36 to deliver the exhaust gases to the exhaust discharge system in the drive shaft housing and lower unit which is not shown and which also may be of any conventional structure.

As should be apparent, the exhaust system and specifically the exhaust manifold arrangement provides a close interconnection between each of the exhaust passages 32 of the cylinder head. Hence, there may be a transfer back of exhaust pulses from one cylinder to the other that can adversely effect engine performance. Although these exhaust pulses are frequently used in two-cycle engines to achieve what is commonly referred to as "exhaust supercharging" such interconnection and interaction is not desirable with four-cycle engines.

It is, therefore, a principal object of this invention to provide an improved exhaust system for a four-cycle internal combustion engine having multiple cylinders.

It is a further object of this invention to provide an improved exhaust system for an outboard motor having multiple cylinders and wherein the exhaust ports are effectively isolated from each other so that the pulses from one cylinder will not have an adverse effect on the operation within another cylinder.

It is a still further object of this invention to provide an improved exhaust system for a multi-cylinder four-cycle outboard motor engine.

SUMMARY OF THE INVENTION

This invention is adapted to be embodied in an outboard motor having a power head comprised of a multi-cylinder internal combustion engine and a surrounding protective cowling. The engine drives a drive shaft which is journaled within a drive shaft housing and lower unit that depends from the power head for driving a propulsion device for propelling an associated watercraft. The engine is provided with a plurality of exhaust ports extending from respective cylinders therefor. At least a pair of exhaust manifolds collect the exhaust gases from pairs of cylinders and transfer them to an exhaust system for discharge to the atmosphere. The exhaust manifolds collect exhaust gases from exhaust ports of cylinders which do not fire in direct sequence with each other so as to minimize the pulse back effect of exhaust gas pressure from one cylinder to another.

DETAILED DESCRIPTION OF THE PREFERRED EMBODIMENTS OF THE INVENTION

Figure 3:
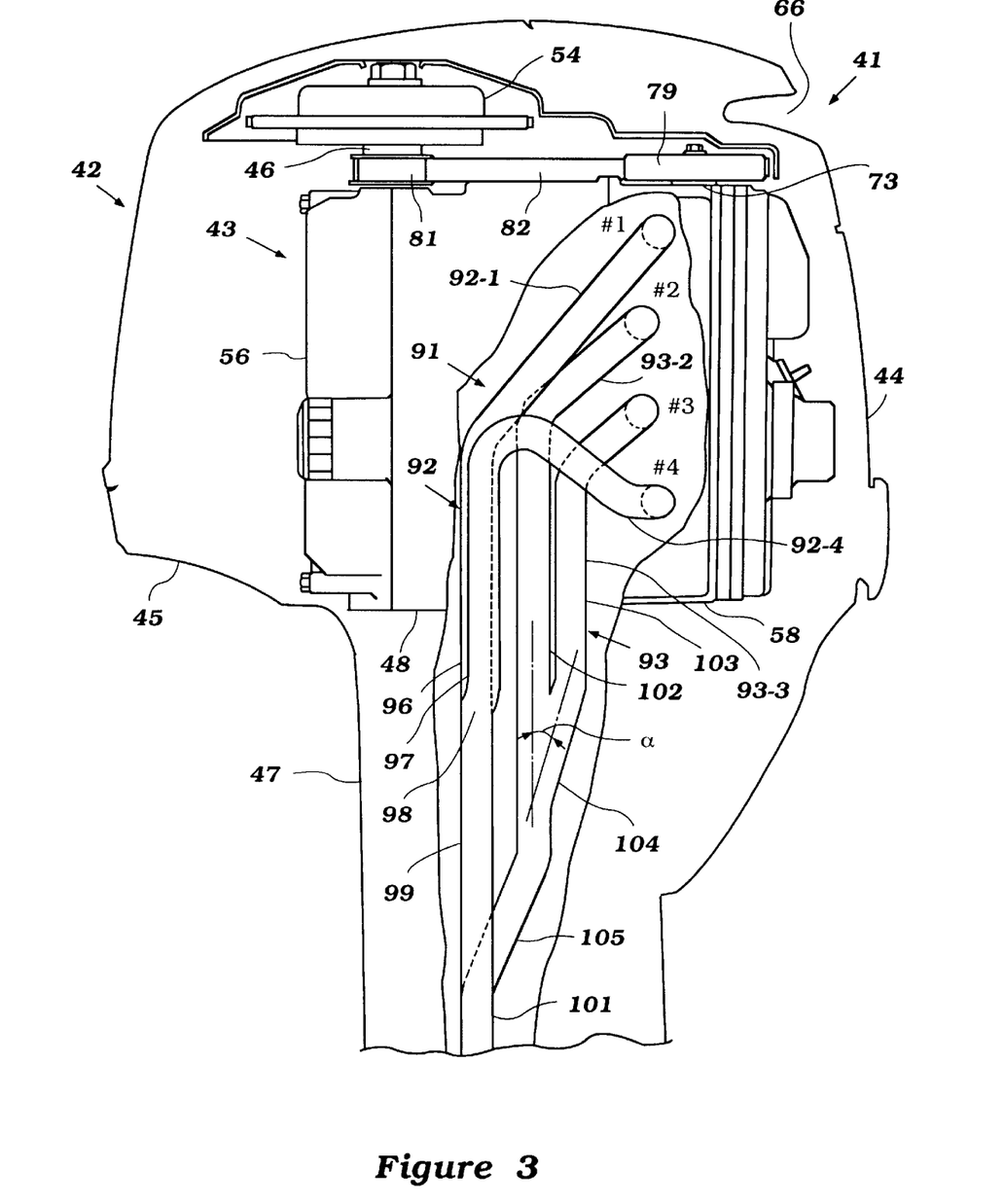
FIG. 3 is a partial side elevational view of an outboard motor constructed in accordance with an embodiment of the invention with portions of the outer surface of the engine broken away and the outer housings shown only in outline to illustrate the exhaust manifolds.
Figure 4:
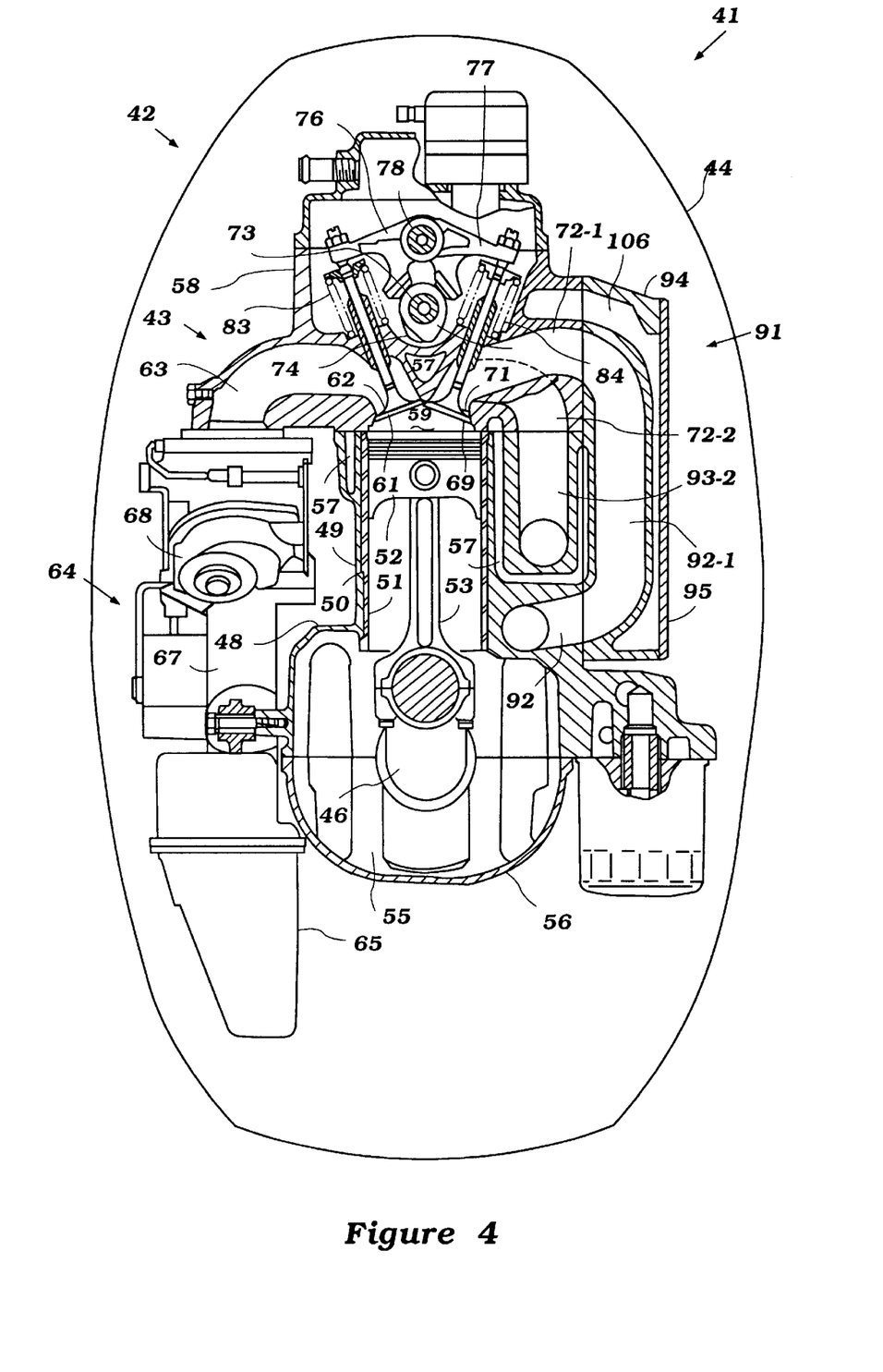
FIG. 4 is a top plan view of the outboard motor of FIG. 3 with portions broken away and other portions shown in section and the protective cowling shown only in outline to illustrate various internal components of the internal combustion engine.

Referring now to the drawings and initially to FIGS. 3 and 4, an outboard motor constructed in accordance with an embodiment of the invention is shown partially and indicated generally by the reference numeral 41. The outboard motor 41 is comprised of a powerhead 42 that includes a powering multi-cylinder internal combustion engine 43. The engine 43 is surrounded by a protective cowling that is comprised of a main cowling portion 44 which is detachably connected to a tray portion 45. A guide plate (not shown) is connected to the tray 45 and upon which the engine 43 is mounted in any suitable manner.

As is typical with outboard motor practice, the engine 43 is supported within the powerhead 42 so that its output shaft, a crankshaft indicated by the reference numeral 46, rotates about a vertically extending axis. This crankshaft 46 is rotatably coupled to a drive shaft (not shown) that rotates about a vertically extending axis and extends through the guide plate and depends into and is journaled within a drive shaft housing and lower unit 47. The tray 45 encircles the upper portion of the drive shaft housing and lower unit 47.

The lower end of the drive shaft is coupled within the drive shaft housing and lower unit 47 to a conventional forward/reverse bevel gear transmission (not shown) which, in turn, is coupled to a propulsion device (not shown), such as, for example, a propeller, for driving the propulsion device in selected forward or reverse directions so as to so propel an associated watercraft (not shown).

The outboard motor 41 is affixed to the watercraft by any known means which allows for steering movement of the outboard motor 41 about a generally vertically extending steering axis, as well as the tilting of the outboard motor 41 about a horizontally extending tilt axis.

The engine 43 will now be described in detail. The engine 43 is in the illustrated embodiment of the four-stroke, four-cylinder inline-type of configuration. To this end, the engine 43 is provided with an cylinder block 48 that defines a cylinder bank 49 in which four horizontally extending, parallel openings are formed in a vertically spaced relationship with each other and in which are pressed fitted or otherwise formed sleeves 50 that define cylinder bores 51 in which pistons 52 reciprocate. In the illustrated embodiment the top most cylinder bore 51 is referred to as the number one cylinder while the subsequent bores 51 are respectively referred to as the numbers two, three and four cylinders. These cylinders 51 operate with a 1-3-4-2 firing order which will be discussed later in relation to the construction of the exhaust system for the engine 43.

Although the invention is described in conjunction with a four-cylinder inline engine, it will be readily apparent to those skilled in the art how the invention may be utilized with engines having various cylinder numbers and cylinder configurations. The invention, however, has particular utility with engines having more than two cylinders, as should be apparent from the foregoing discussion.

The pistons 52 are pivotally connected to the small ends of respective connecting rods 53 whose big ends are rotatably journaled about the throws of the crankshaft 46. A flywheel 54 is affixed to the upper end of the crankshaft 46 and assists in the smooth operation of the engine 43 at lower engine speeds.

The crankshaft 46 is rotatably journaled about a vertically disposed axis by any suitable means within a crankcase 55 which is defined by the forward facing end of the cylinder block 48 and a crankcase member 56 which is affixed to the front face of the cylinder block 48 by any suitable means.

The engine 43 is water cooled. For this reason, a water jacket 57 is disposed adjacent to and above the cylinder bores 51 so as to cool the engine 43. Water from the body of water in which the outboard motor 11 is operating is circulated through the water jackets 57 in a known manner.

A cylinder head is indicated by the reference numeral 58 and affixed to the rearward facing end of the cylinder bank 49 in a known manner. The cylinder head 58 has individual recesses 59 that cooperate with the cylinder bores 51 and pistons 52 to define the engine combustion chambers.

An intake valve 61 is slidably supported in the cylinder head 58 in association with each of the combustion chambers 59 in the cylinder head 58 and controls a respective intake port 62 that cooperates with the inner end of an intake passage 63 formed in the cylinder head 58. The outer end of the intake passage 63 is served by an induction and charge forming system that is indicated by the reference numeral 64 and includes an air box 65. The air box 65 receives a supply of atmospheric air through an opening 66 formed in the upper end of the main cowling 44 and delivers the air through an intake manifold 67 to one or more carburetors 68 or other charge formers.

The carburetors 68 mix the air with a supply of fuel from a fuel tank (not shown) suitably positioned within the hull of the associated watercraft in a ratio that is suitable for combustion. This air fuel charge is then delivered to the combustion chambers 59 through the intake passages 63. The amount of air fuel charge delivered to the combustion chambers 59 is regulated by throttle valves (not shown) that are disposed within the carburetors 68.

Exhaust valves 69 are slidably supported in the cylinder head 58 and control the flow of the exhaust gases from the combustion chambers 59 through exhaust ports 71 and into exhaust passages 72-1 through 72-4 formed in the cylinder head 58. The exhaust passage 72-1 is associated with the number one cylinder exhaust port 71 and terminates at the side of the cylinder head 58. A further exhaust passage 72-2 is also shown in FIG. 4 and cooperates with the number two cylinder exhaust port 71 which is not illustrated and terminates at the surface of the cylinder head 58 facing the cylinder block 48. Additionally, two further exhaust passages 72-3 and 72-4 which are not illustrated are formed in the cylinder head 58 in like manner as the exhaust passages 72-2 and 72-1 respectively and cooperate with the numbers three and four cylinders 51. The four exhaust passages 72-1 through 72-4 are associated with and form a portion of an exhaust system for silencing and discharging of the exhaust gases which will be discussed in detail later.

A single overhead camshaft is indicated by the reference numeral 73 and is rotatably journaled within the cylinder head 58 in a known manner between the intake and exhaust valves 61 and 69. The camshaft 73 is provided with intake and exhaust cam lobes 74 and 75, respectively, that operate on intake and exhaust rocker arms 76 and 77 which are rotatably journaled about a rocker arm shaft 78. The rocker arm shaft 78 is mounted in a known manner within the cylinder head 58 above of and extending parallel to the camshaft 73. The outer ends of the intake and exhaust rocker arms 76 and 77 operate on the tips of the intake and exhaust valves 61 and 69.

A camshaft pulley 79 is affixed to the upper end of the camshaft 73. The pulley 79 is driven from a crankshaft pulley 81 that is affixed to the upper end of the crankshaft 46 beneath the flywheel 54 through a drive belt 82. As is well known in the art, the camshaft 73 is driven by the crankshaft 46 at one-half crankshaft speed which is accomplished by a 2 to 1 reduction of the camshaft pulley 79 relative to the crankshaft pulley 81. Thus, the intake and exhaust valves 61 and 69 are opened at the appropriate times by their associated cam lobes 74 and 75 by the crank-driven camshaft 73 through the rocker arms 76 and 77. Additionally, intake and exhaust valve return springs 83 and 84 are associated with the valves 61 and 69 respectively and serve to close the valves 61 and 69.

The exhaust system for the engine 43 will now be discussed in detail. As previously stated, the exhaust system silences and discharges the exhaust gases from the combustion chambers to the atmosphere through the body of water in which the associated watercraft is operating. These exhaust systems include individual exhaust passages associated with each of the cylinders that merge into an exhaust manifold. A problem exists with this arrangement, however, in that the exhaust pulses from adjacent firing cylinders tends to adversely affect the combustion cycles of other cylinders and, therefore, result in less than optimum engine performance. This invention minimizes this adverse condition by providing an exhaust system arrangement where the exhaust pulses from each of the cylinders are inhibited from adversely affecting the operation of the other cylinders.

With continued reference now to FIGS. 3 and 4, an exhaust system for the four-cylinder engine 43 is indicated by the reference numeral 91 and includes a pair of exhaust manifolds that are indicated by the reference numerals 92 and 93, respectively. The first exhaust manifold 92 is defined by a pair of inlet sections 92-1 and 92-4, which extend from the number 1 and 4 cylinder head exhaust passages 72-1 and 72-4 which exit the side of the cylinder head 58. The inlet sections 92-1 and 92-4 for the numbers 1 and 4 cylinders 51 are paired with the same exhaust manifold since these cylinders do not fire sequentially in the engine 43, which is configured with a 1-3-4-2 firing order. This minimizes the effect of the exhaust pulse from one of the cylinders of the manifold 92 on the operation of the other cylinder served by this manifold 92.

The inlet sections 92-1 and 92-4 are, in part, integrally formed within an exhaust plate 94 that is affixed to the side of the engine 43 and specifically in the area overlapping the sides of the cylinder head 58 and the cylinder block 48 by any suitable means and is covered by a cover 95. The inlet section 92-1 extends forwardly and along the side of the cylinder block 48 at which point it turns into and communicates with a further portion formed in the cylinder block 48 adjacent the crankcase chamber 55. The inlet section 92-1 then extends downwardly through the cylinder block 48 and terminates at the lower surface of the cylinder block 48.

The inlet section 92-4 extends forwardly and upwardly through the exhaust plate 94 and into the cylinder block 48 where it also continues and extends downwardly through the cylinder block 48 parallel to the inlet section 92-1 and terminates at the lower surface of the cylinder block 48.

A pair of exhaust headers or collectors are indicated by the reference numerals 96 and 97 and affixed by any suitable means to the lower surface of the cylinder block 48. The headers 96 and 97 open at their upper ends to the lower ends of the inlet sections 92-1 and 92-4 respectively and extend downwardly from the cylinder block 48 into the drive shaft housing and lower unit 47 and merge to a collector that form a common discharge end 98 for the first manifold 92.

It should be noted that the inlet section 92-1 and its associated header 96 and the inlet section 92-4 and its associated header 97 are configured so as to have equal lengths. This further reduces the effect of the exhaust pulse from one of the cylinders of the manifold 92 on the operation of the other cylinder and balances the cylinder to cylinder operation.

The common discharge end 98 of the headers 96 and 97 opens to a vertically extending collector 99 which extends downwardly through the drive shaft housing and lower unit 47 and opens to an exhaust pipe 101 that is disposed within the drive shaft housing and lower unit 47 and discharges the exhaust gases into a silencing expansion chamber and then to the atmosphere through the body of water in which the associated watercraft is operating as is known in the art.

The second exhaust manifold 93 is defined by further pair of inlet sections 93-2 and 93-3 which respectively open at their upper ends to the numbers 2 and 3 exhaust passages 72-2 and 72-3 which exit the cylinder head 56 at the surface facing the cylinder block 48. The inlet sections 93-2 and 93-3 for the numbers 2 and 3 cylinders 51 are paired with the same exhaust manifold since these cylinders do not fire sequentially and thus the effect of the exhaust pulse of one of the cylinders on the operation of the other cylinder is minimized.

The inlet sections 93-2 and 93-3 are integrally formed within the cylinder block 48 between the inlet sections 92-1 and 92-4 and the cylinder bores 51 as seen in FIG. 4. These inlet sections 93-2 and 93-3 extend forwardly and downwardly within the cylinder block 48 until they approach the inlet section 92-4 as seen in FIG. 3, at which point both the sections 92-2 and 92-3 extend downwardly and parallel to each other. The inlet sections 93-2 and 93-3 terminate at the lower surface of the cylinder block 48 and open to respective exhaust headers or collectors 102 and 103 that are affixed to the lower surface of the cylinder block 48 by any suitable means and extend downwardly through the drive shaft housing and lower unit 47. At approximately the height at which the headers 96 and 97 for the first exhaust manifold 92 merge to form the common discharge end 98, the header 103 bends forwardly at an angle α from vertical to merge with the header 102 to form a common discharge end 104 within the drive shaft housing and lower unit 47.

This common discharge end 104 opens to a second vertically extending collector 105 which extends downwardly and forwardly through the drive shaft housing and lower unit 47 and opens to the exhaust pipe 101 which also serves the collector 99 for the first exhaust manifold 92. The collector 105 also discharges into the aforenoted expansion chamber.

Again, it is to be noted that the length of the inlet 93-2 and header 102 is the same as the length of the inlet section 93-3 and header 103 so as to further reduce the effect of the exhaust pulses of each of the cylinders of the manifold 93 on the other cylinder.

A portion of the water jacket 57 is disposed in the cylinder block 48 on the exhaust side of the engine 43 and extends between the exhaust manifolds 92 and 93, and is defined, in part, by the inner surface of the exhaust plate 94. A further water jacket 106 is also defined by the exhaust plate 94 and cover 95, and surrounds the outer surface of the exhaust manifold 92. Thus, the manifolds 92 and 93 are surrounded and separated by the water jackets 57 and 106 which serve to cool the exhaust gases.

The above exhaust system functions in the following manner. As previously stated, the engine 43 operates with a 1-3-4-2 firing order. With the above exhaust system 91, the exhaust pulse from the number 1 cylinder is directed through the exhaust passage 72-1 to the inlet section 92-1 and header 96 of the first exhaust manifold 92 and then goes to the collector 99 before reaching the exhaust pipe 101, while the subsequent number 3 cylinder exhaust pulse is directed through the inlet section 93-3 and header 103 of the second exhaust manifold 93 and then goes to the collector 105 and on to the exhaust pipe 101. Thus, the subsequent exhaust pulses are directed along different routes to the exhaust pipe 101 and, therefore, any adverse affects of the number 1 cylinder exhaust pulse are isolated from the number 3 cylinder.

In like manner, the exhaust system 91 precludes the number 4 cylinder operation from being negatively affected by the number 3 cylinder exhaust pulse, and the number 2 cylinder operation from being negatively affected by the number 4 cylinder exhaust pulse.

Figure 5:
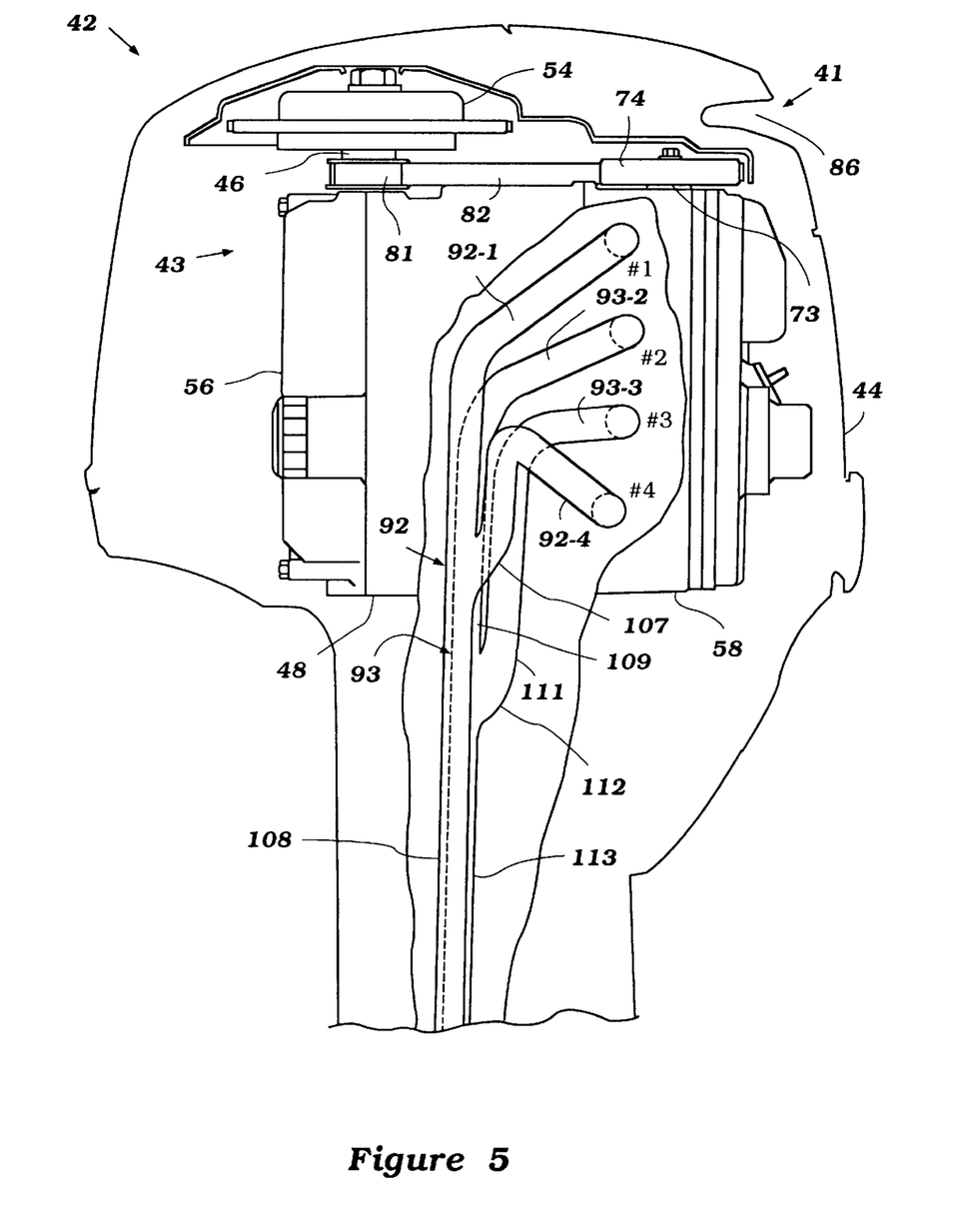
FIG. 5 is a partial side elevational view similar to FIG. 3 and shows a further embodiment of the invention.
Figure 6:
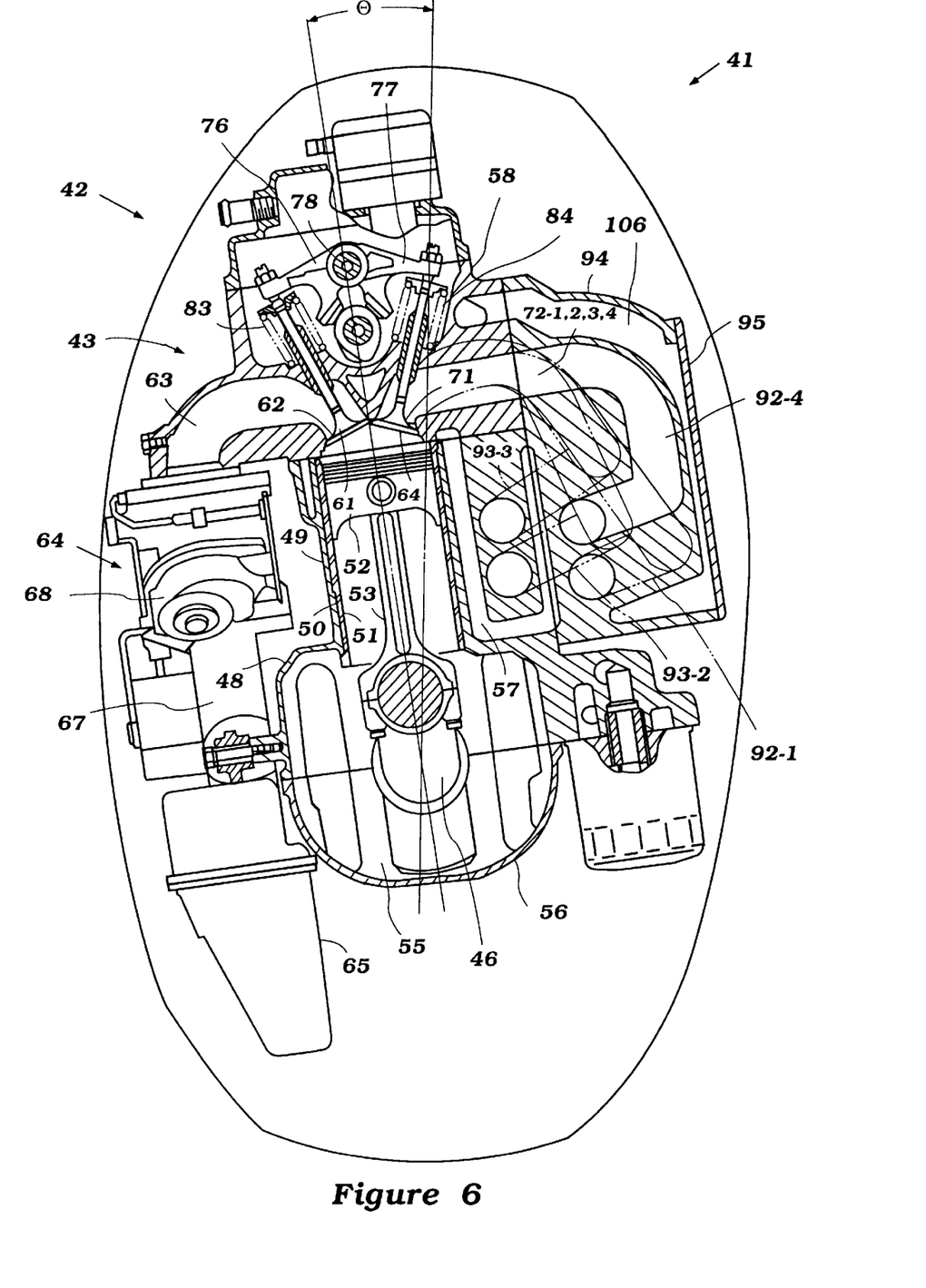
FIG. 6 is a top plan view with portions broken away and shown in cross-section and with of the protective cowling shown only in outline for the embodiment of FIG. 5.

FIGS. 5 and 6 illustrate a further exhaust system configuration in which the manifolds 92 and 93 are completely isolated from each other. The exhaust passages 72-1 through 72-4 all open to the side of the cylinder head 58 that faces the exhaust plate 94. The exhaust passages 72-1 and 72-4 open to the first exhaust manifold inlet sections 92-1 and 92-4, which are integrally formed within the exhaust plate 94. The inlet section 92-1 extends forwardly and downwardly from the exhaust passage 72-1 within the exhaust plate 94 and then curves inwardly and approaches the cylinder block 48 before extending downwardly within the exhaust plate 94 adjacent to the water jacket 57. The inlet section 92-4 extends outwardly from the exhaust passage 72-4 before turning forwardly and upwardly within the exhaust plate 94. The inlet section 92-4 then curves inwardly before extending downwardly within the exhaust plate 94 parallel to the inlet section 92-1.

The lower ends of the inlet sections 92-1 and 92-4 merge to form a common discharge end 107 that terminates at the lower surface of the exhaust plate 94 and opens to a vertically extending collector 108. The collector 108 is affixed to the lower surface of the exhaust plate 94 by any suitable means and extends through drive shaft housing and lower unit 47 and serves as an exhaust pipe for discharging the exhaust gases from the outboard motor 41 through an expansion chamber and underwater discharge.

Again, it is to be noted that the lengths of the inlet sections 92-1 and 92-4 to the point where they merge are the same so as to minimize the effects of the cylinder's exhaust pulses on each other.

The exhaust passages 72-2 and 72-3 open to the second exhaust manifold inlet sections 93-2 and 93-3, respectively, which are also integrally formed within the exhaust plate 94 and extend forwardly and downwardly before curving inwardly and extending into the cylinder block 48. The inlet sections 93-2 and 93-3 then extend downwardly through the cylinder block 48 and terminate at the lower surface of the cylinder block 48.

A pair of exhaust headers 109 and 111 are affixed to the lower surface of the cylinder block 48 and receive the exhaust gasses from the inlet sections 93-2 and 93-3 respectively. The headers 109 and 111 extend downwardly through the drive shaft housing and lower unit 47 and merge at their lower ends to form a common discharge end 112. This common discharge end 112 opens to a second collector 113 which also serves as an exhaust pipe completely independently of the exhaust pipe 108.

As seen in FIG. 6, the water jackets 57 and 106 surround and separate the manifolds 92 and 93. It should also be noted that the exhaust plate 94 is somewhat wide since all the inlet sections 92-1 and-92-4, 93-2 and 93-3 are disposed at least in part in the exhaust plate 94. This necessitates the rotation of the engine 43 through an angle θ about the crankshaft 46 in order to enable the mounting of the engine 43 within the powerhead 42.

With the above exhaust system configuration, the exhaust pulse for a given cylinder 51 is inhibited from affecting the operation of the subsequent cylinder in the firing order since this pulse is directed down a manifold that is completely isolated from the subsequent cylinder in the firing order. The effect of the cylinder's exhaust pulse on the operation of the other cylinder associated with the same exhaust manifold is also reduced in the manner previously described.

Figure 7:
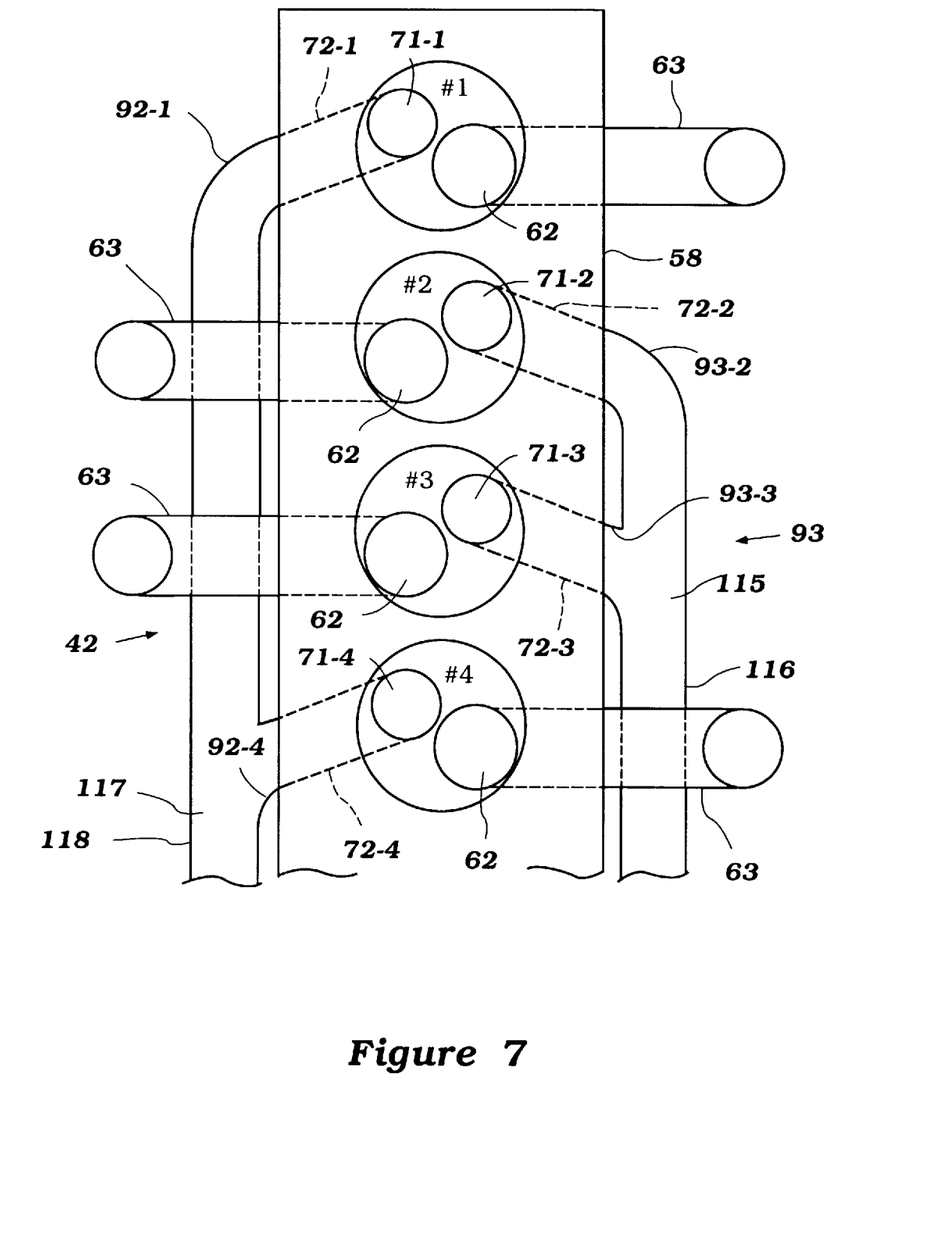
FIG. 7 is a partially schematic front elevational view of an outboard motor engine having an exhaust manifold constructed in accordance with a further embodiment of the invention.
Figure 8:
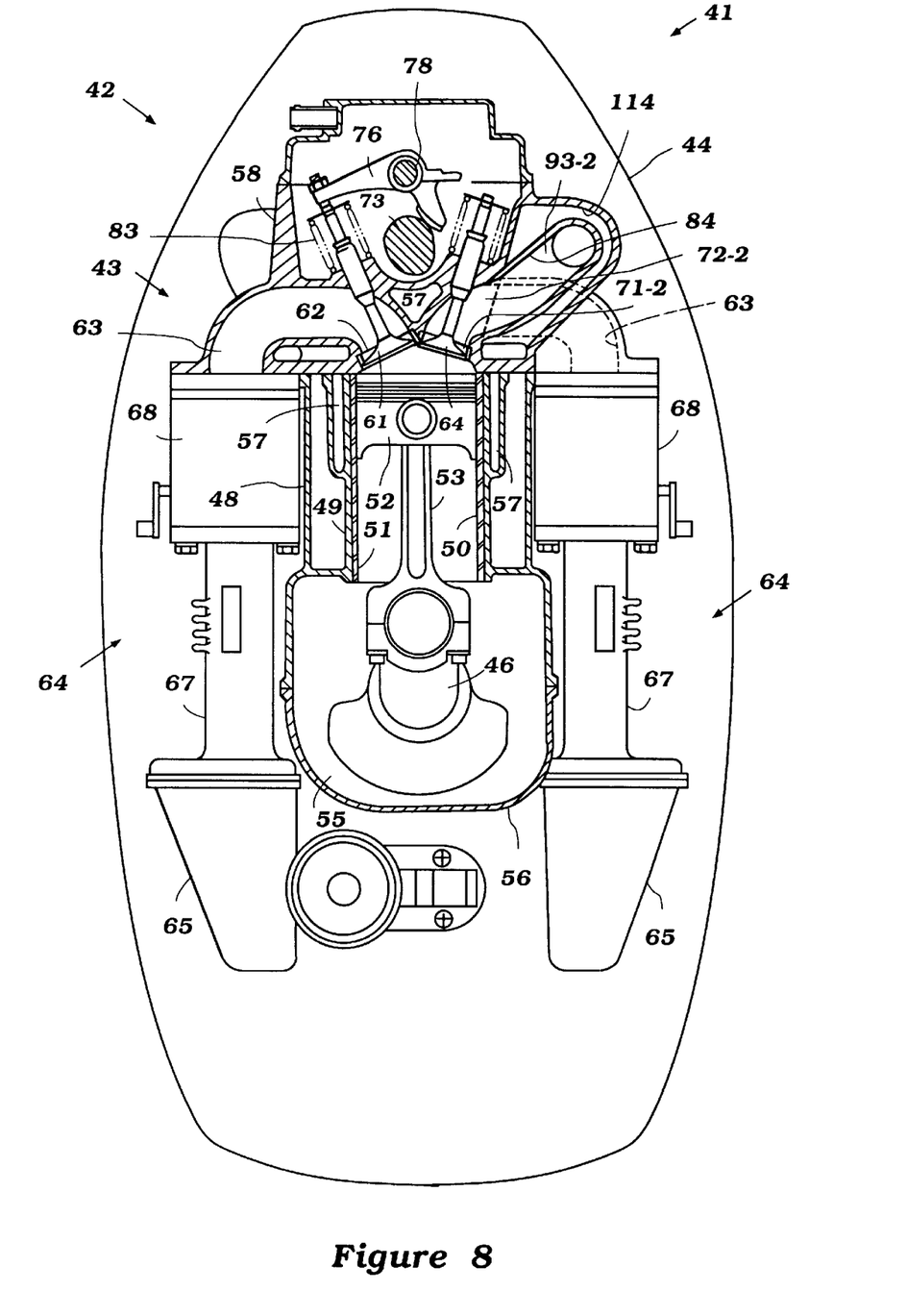
FIG. 8 is a top plan view with portions broken and shown in cross-section view and the protective cowling shown only in outline of the embodiment of FIG. 7.

FIGS. 7 and 8 illustrate a further exhaust system configuration in which the exhaust manifolds 92 and 93 are integrally formed within the cylinder head 58 and spaced transversely across the cylinder head 58 from each other.

As seen in FIG. 7, which is a front elevational view of the exhaust manifolds 92 and 93, the exhaust manifold 92 is disposed along the right side of the engine 43 as are the associated exhaust ports for the numbers 1 and 4 cylinders 71-1 and 71-4, while the exhaust manifold 93 is disposed along the left side of the engine 43 as are its associated exhaust ports 71-2 and 71-3 completely independently of the left manifold 92.

As seen in FIG. 8, the exhaust passage 72-2 extends outwardly and rearwardly on the left side of the cylinder head 58 from its exhaust port 71-2 and opens to a inlet section 93-2 that is integrally formed within the cylinder head 58 and surrounded by a water jacket 114 for cooling of the exhaust gasses. In like manner the exhaust passage 72-3 opens to an inlet section 93-3 that is disposed within the cylinder head 58 below the inlet section 93-2. The runner sections 93-2 and 93-3 merge at a common collector and discharge 115 which opens to an exhaust section 116 that extends downwardly through the cylinder head 58 and terminates at the lower surface of the cylinder head 58. An exhaust pipe (not shown) that is disposed within the drive shaft housing and lower unit 47 communicates with the collector 116 for discharging of the exhaust gasses to the atmosphere through an expansion chamber and underwater discharge.

The exhaust passages 72-1 and 72-4 extend outwardly and rearwardly on the right side of the cylinder head 58 from their associated exhaust ports 71-1 and 71-4 and open to inlet sections 92-1 and 92-4 respectively. The inlet sections 92-1 and 92-4 are integrally formed within the cylinder head 58 and surrounded by water jackets 114 and merge at a common collector and discharge end 117. The common discharge end 117 opens to an exhaust section 118 that extends downwardly and terminates at the lower surface of the cylinder block 58. An exhaust pipe (not shown) that is disposed within the drive shaft housing and lower unit 47 opens to the collector 118 for discharging of the exhaust gasses to the atmosphere through the expansion chamber and underwater discharge.

A pair of induction and charge forming systems 64 are utilized with the above configuration. A right side system supplies the numbers 2 and 3 cylinders with an air fuel charge, while a left side system for supplying the numbers 1 and 4 cylinders.

The above exhaust system configuration isolates the exhaust pulses in the manner described by the previous embodiment while providing an overall compact assembly that is readily packaged within the powerhead 42.

In describing each embodiment reference has been made to expansion chambers and underwater discharges. It should be apparent that each embodiment lends itself to use with any of the known types of outboard motor silencing systems. Also, as is typical in this art, these systems may also incorporate low speed above the water discharges for low speed operation.

Thus, from the foregoing description it should be readily apparent that the described construction provides a compact exhaust system in which the exhaust pulse from one cylinder is inhibited from adversely affecting the operation of the other cylinders. Of course, the foregoing description is that of preferred embodiments of the invention. Those skilled in the art will readily understand how the invention may be applied to other constructions, without departing from the spirit and scope of the invention, as defined by the appended claims.

What is claimed is:

1. An outboard motor comprised of a power head consisting of a multi-cylinder internal combustion engine and a surrounding protective cowling, a drive shaft journaled for rotation within a drive shaft housing and lower unit depending from said power head and driven by said engine, and a propulsion device driven by said drive shaft for propelling an associated watercraft, said engine having a plurality of exhaust ports each serving at least one of said cylinders of said engine, and an exhaust system for discharging exhaust gases from said cylinders to the atmosphere, said exhaust system comprising at least a pair of exhaust manifolds each having a pair of inlet sections communicating with the respective exhaust ports of a pair of cylinders and having a common discharge end, said cylinders served by said exhaust manifolds being fired so that no two cylinders served by the same exhaust manifold fire consecutively for minimizing the effect of pulse back from one exhaust port to another.

2. An outboard motor as set forth in claim 1, wherein the engine has at least four cylinders and operates on a four-stroke principle.

3. An outboard motor as set forth in claim 2, wherein at least four of the cylinders of the engine are formed in a common cylinder bank.

4. An outboard motor as set forth in claim 3, wherein the cylinders of the same cylinder bank are vertically spaced one above the other and the cylinder bores thereof extend horizontally.

5. An outboard motor as set forth in claim 1, wherein the engine is a four-stroke engine and has a cylinder block in which the cylinder bores are formed and a cylinder head in which the exhaust ports are formed.

6. An outboard motor as set forth in claim 5, wherein at least one of the exhaust manifolds is formed at least in part in the cylinder block.

7. An outboard motor as set forth in claim 5, wherein both of the exhaust manifolds are formed at least in part in the cylinder block.

8. An outboard motor as set forth in claim 7, wherein the parts of the exhaust manifolds formed in the cylinder block are spaced from each other.

9. An outboard motor as set forth in claim 8, further including a water jacket formed in the cylinder block and separating at least in part the exhaust manifolds from each other.

10. An outboard motor as set forth in claim 5, wherein at least one of the exhaust manifolds is formed at least in part in the cylinder block and at least a portion of the other exhaust manifold is formed in a body affixed to the side of the cylinder block.

11. An outboard motor as set forth in claim 10, further including a water jacket formed in the cylinder block and separating at least in part the exhaust manifolds from each other.

12. An outboard motor as set forth in claim 11, further including a water jacket formed in the body and cooling at least in part the other exhaust manifold.

13. An outboard motor as set forth in claim 5, wherein some of the exhaust ports are formed on one side of the cylinder head and other of the exhaust ports are formed on the other side of the cylinder head.

14. An outboard motor as set forth in claim 13, wherein all of the exhaust ports on the same side of the cylinder head are served by the same exhaust manifold.

15. An outboard motor as set forth in claim 14, wherein the exhaust manifolds are at least in part water cooled.

16. An outboard motor as set forth in claim 5, wherein some of the exhaust ports are formed on one side of the cylinder head and other of the exhaust ports are formed on a surface of the cylinder head that faces the cylinder block.

17. An outboard motor as set forth in claim 16, wherein at least one of the exhaust manifolds is formed at least in part in the cylinder block and at least a portion of the other exhaust manifold is formed in a body affixed to the side of the cylinder block.

18. An outboard motor as set forth in claim 17, further including a water jacket formed in the cylinder block and separating at least in part the exhaust manifolds from each other.

19. An outboard motor as set forth in claim 18, further including a water jacket formed in the body and cooling at least in part the other exhaust manifold.

20. An outboard motor as set forth in claim 17, wherein the exhaust manifold formed at least in part in the cylinder block serves those exhaust ports formed in the surface of the cylinder head that faces the cylinder block.

21. An outboard motor as set forth in claim 20, wherein the exhaust manifold formed at least in part in the body serves the exhaust ports formed on the one side of the cylinder head.

22. An outboard motor as set forth in claim 21, further including a waterjacket formed in the cylinder block and separating at least in part the exhaust manifolds from each other.

23. An outboard motor as set forth in claim 22, further including a water jacket formed in the body and cooling at least in part the other exhaust manifold.

* * * * *